United States Patent Office 2,833,621
Patented May 6, 1958

2,833,621

METHOD OF PREPARING METALLURGICAL GRADE ALUMINA

David H. Reeve, Chicago, Ill., assignor, by mesne assignments, to the United States of America as represented by the United States Atomic Energy Commission No Drawing. Application May 27, 1955
Serial No. 511,752

6 Claims. (Cl. 23—142)

This invention relates to a method of preparing metallurgical grade alumina of relatively low phosphate content and relatively high bulk density. Still more particularly, it relates to a method of preparing alumina from so-called crude alum or ammonium aluminum sulfate. Still more particularly, it relates to the preparation of relatively phosphate-free alumina from solutions containing the water soluble reaction products prepared by a digestion of leached zone material of the Florida pebble phosphate fields.

Leached zone material consists largely of a silty to clay-like sand containing components of aluminum, iron, phosphorus and minor values, together with other clays and slimes.

This leached zone material while not a true clay exhibits a porous and generally soft, pliable structure. Mineralogically it consists of quartz, wavellite and perhaps pseudo-wavellite as the major phases. Chemically, it is considered to be a mixture of hydrated aluminum and calcium aluminum phosphate with fine quartz, iron oxide, compounded fluorine and some clay. Also there may be some unleached and partially leached tricalcium phosphate. The following analyses of leached zone material was obtained by averaging analyses obtained from about 200 drill core samples procured over an area of about 36 square miles. The leached zone material averages as follows:

| | Percent |
|---|---|
| $P_2O_5$ | 8.7 |
| $Al_2O_3$ | 8.7 |
| CaO | 6.4 |
| Acid insolubles | 68.7 |

Since the vast percentage of the acid insoluble material is quartz and since it is a coarser particle size than the other materials contained in the material being mined, it has been found advantageous, but not necessary to the invention, to split the ore after suitable comminution, if desired, into one fraction of small particles and another fraction of coarser particles, the split being made at from about 150 mesh up to about 220 mesh after the material has been slurried with water. The fraction containing the particles smaller than this is the valuable fraction, while the fraction containing the particles larger than this is the fraction which is for the most part quartz and is discarded.

In the processing of unsized or sized leached zone material for recovery of the phosphate values, the material with or without a preliminary calcining operation has been digested with various mineral acids such as sulfuric acid or nitric acid or with acid salts such as ammonium bisulfate. While solubilizing of leached zone constituents can be accomplished by reacting material to form the counterpart of superphosphate and leaching the mixture with water, it is generally preferred to carry out a reaction whereby a slurry is formed having the water soluble reaction products in the liquid phase.

In the prior processes, the aluminum constituents of the liquid phase or aqueous extract have been precipitated by adding to the solution ammonium sulfate. The alum or ammonium aluminum sulfate precipitated by reaction with ammonium sulfate removes about 70% of the aluminum present in the solution and about 1% of the phosphate. The resultant solution contains about all of the iron, about 99% of the phosphate and about 30% of the aluminum initially present in the aqueous solution. This resultant solution when processed to remove iron and aluminum has always given a product tying up about 70% of the phosphate present in the treated solution, leaving only about 30% of the $P_2O_5$ values for recovery in a useful form, for example, as ammonium phosphate.

This crude alum or ammonium aluminum sulfate has too high a $P_2O_5$ content to be acceptable to the aluminum industry being of the order of 0.3% or higher. The aluminum industry requires that this $P_2O_5$ content be less than about 0.04% by weight. This requirement is rigidly enforced because the presence of phosphate decreases cell operating efficiency and shortens cell life due to corrosion.

Treatment of crude or recrystallized alum with excess ammonia to form pseudomorphous aluminum trihydrate does not convert crude alum to a useful product because substantially all the $P_2O_5$ present in solution is removed with the aluminum trihydrate product.

Heat treatment of crude alum reduces the $P_2O_5$ content of the alumina measureably, but produces a calcined product of a bulk density unacceptable to the aluminum trade. Crude alum can be purified and its $P_2O_5$ content reduced to amounts tolerated by the aluminum industry by repeated solubilizing and recrystallizing of the alum, but such operations make the process too expensive to be economically feasible.

It is a primary object of this invention to provide a method which overcomes the shortcomings and disadvantages of processes heretofore in use.

It is another object of this invention to produce an alumina of a bulk density acceptable to the aluminum industry from leached zone material.

It is still another object of this invention to produce an alumina of metallurgical grade having preferably less than 0.04% $P_2O_5$ content. These and other objects of the invention will be apparent from the following description.

Briefly, the invention comprises heat treating crude alum $[(NH_4)_2SO_4 \cdot Al_2(SO_4)_3 \cdot 24H_2O]$ to reduce the chemically bound water to less than about 12 moles of water of crystallization at temperatures below the decomposition temperature of ammonium aluminum sulfate and admixing the heat treated alum with coke of high purity and having a relatively high burning temperature and calcining the mixture under conditions to maintain a reducing atmosphere, thereby driving off the ammonia and sulfate and recovering an alumina of relatively high bulk density.

It has been discovered that the low bulk density of the product obtained by processing crude alum arises from the fact that as constituted with 24 moles of water plus impurities, the alum changes or melts readily at temperatures below those at which water is volatilized, until the chemically bound water is reduced below about 12 moles of water per mole of $Al_2O_3$. Water cannot be removed from alum of 24 moles of water of crystallization without changing the physical structure of the alum crystals if high temperatures such as calcination temperatures are used from the start.

It has been further found that the high heat treatment of calcination, in addition to the melting effects, destroys the tetrahedral crystal structure of the alum, producing a fine powder having a consistency approaching that of talc.

By the process of the instant invention, both of these difficulties are overcome. The ammonium aluminum sulfate or so-called crude alum which crystallizes with 24 moles of water of crystallization is partially dehydrated at temperatures below the melting point of crude alum by subjecting the material to elevated temperatures under conditions to remove moisture vapor from contact with the heat treated alum. If heating is accomplished at atmospheric or super atmospheric pressures, temperature of the crude alum must not exceed about 92° C. and preferably is maintained in the range between about 50° C. and 90° C. Under such conditions, dehydration is expedited by the passage of dry gases in contact with the heat treated particles. Since more economical and faster dehydration is effected at higher temperatures, the preferred procedure is to heat treat the particles while they are maintained under subatmospheric pressure or vacuum. Useful temperatures under these conditions range from about 50° C. to about 250° C., preferably between about 150° C. and about 230° C.

The preliminary heat treatment operation may be carried out in electric ovens, tunnel dryers, vacuum ovens, rotary kilns and equivalent apparatus.

The length of the heat treatment period will depend upon the subatmospheric pressure or vacuum level and the temperature level. For efficient operation, the heat treatment is carried out while maintaining subatmospheric pressures between about 4 and about 12 lbs./sq. in. absolute, preferably about 5 to 10 lbs./sq. in. absolute, at a temperature of about 230° C. for between about 1 and about 4 hours. This removes about 12 to 16 moles of water of crystallization from crude alum. At about 90° C. and at atmospheric pressure between about 15 and 30 hours are required to remove about the same number of moles of water of crystallization from crude alum.

Upon completion of the preliminary heat treatment the partially dehydrated alum is mixed with relatively pure coke or carbon in quantities insuring that at the calcination temperatures used some carbon will be present throughout substantially the whole of the treatment period. In general, the quantity of carbon varies with the type of hot gases maintained in contact with the mixture. If the gases are products produced under closely maintained combustion conditions, the free oxygen will be low and only about 25 pounds of carbon per ton of crude alum will be required. On the other hand, if access of air to the heat treatment zone is not prevented, then quantities of the order of 250 pounds of carbon per ton of crude alum may be required. Preferably conditions are maintained such that between about 50 pounds and about 150 pounds of carbon per ton of alum will suffice to maintain the reducing atmosphere. Petroleum coke, vegetable coke, sold under the trade name of Nuchar and the like or mixtures thereof, are representative carbon material useful in the instant process.

The heat treatment operation may be conducted at temperatures in the range between about 700° C. and about 1400° C., preferably at temperatures of between about 900° C. and about 1200° C., while maintaining pressures seldom exceeding 15 pounds per square inch gauge. The reaction achieves volatilization of all of the ammonia substantially as nitrogen and substantially all of the sulfate as sulfur dioxide and the preferred temperature range or above converts the alumina to the alpha form. The gases leaving the heat treatment zone may be scrubbed with different mediums at a variety of temperatures to effect recovery of nitrogen and sulfur dioxide, as desired.

More in detail as applied to a preferred embodiment of the invention, the small particle size fraction of leached zone material obtained by splitting the solids at a size of approximately 200 mesh with or without a preliminary calcining treatment is solubilized by reaction with an acid such as sulfuric acid, sulfur dioxide or equivalent materials. In a typical reaction, a 200 mesh size fraction in aqueous slurry form having a solids content in the range between about 30% and about 60% is reacted with the sulfuric acid at temperatures in the range between about 60° C. and about 90° C.

Preferably, the digestion is carried out for a period of time ranging between 0.2 and about 15 hours and still more specifically, for a period of about 30 minutes to about 60 minutes, although the length of time may be varied considerably depending upon other variables in reaction conditions. The interdependence of variables makes for vast differences in the specific conditions employed as to each variation. In general, it may be stated the higher the percent acid acidulation used, the lower the time required. Thus, for example, if about 70% acidulation is used, i. e., about 106.5 pounds of 96% sulfuric acid per 100 pounds of leached zone material, only about 15 minutes is required to accomplish the digestion, while at about 45% acidulation, about 6 hours digestion is necessary to give good recovery of the desired constituents. Depending upon the analysis of the particular leached zone material processed, between about 30% and about 105% acidulation is desired. This corresponds to the addition of between about 29 pounds and about 150 pounds of sulfuric acid per hundred pounds of leached zone material processed. Preferably, about 70% acidulation is used. The percent acidulation referred to in this description is calculated on the basis of the reaction of sulfuric acid with all of the iron, aluminum and calcium, or other significant cationic constituents present in the leached zone material. In other words, 100% acidulation would be the addition of that amount of sulfuric acid required to completely react with these components.

After digestion, the aqueous solution of reaction products is separated from the insolubles such as quartz. The solution may be treated with ammonium sulfate to precipitate ammonium aluminum sulfate or so-called alum. This precipitation will remove a major portion of the aluminum from solution. After separating the precipitated ammonium alum solids, the solution may be treated with an ammonium reactant, such as gaseous ammonia, ammonium hydroxide, ammonium carbonate and the like to precipitate the balance of the aluminum and all of the iron as phosphate salts.

The ammonium aluminum sulfate crystals are heated to approximately 230° C. for about 60 to 90 minutes while being maintained under a vacuum of 10 to 20 inches of mercury. At the end of this treatment period the partially dehydrated material is removed from the drying mechanism and analyzed for moles of water of crystallization, the treatment under these conditions usually removing 10 to 17 moles of water out of a total of 24 moles of water crystallization. After the preliminary heating, the partially dehydrated material is admixed with approximately 100 to 200 pounds of petroleum coke per ton of dehydrated material. Only about 100 to 120 pounds of this coke would be necessary for maintaining a reducing atmosphere for the decomposition reaction. Under certain conditions, however, extra coke can be utilized to compensate for slight excesses of water, in which event the unreacted coke can be removed from the alumina product. The admixture is then fed to a calciner, the solids being moved generally countercurrent to drying gases. If the calciner is of the rotary kiln type, it is preferably equipped with internal lifters such that material is raised to substantially the top of the kiln during rotation and then dropped through the hot calcining gases.

During the calcining the ammonium aluminum sulfate is decomposed, the sulfate being driven off in the form of sulfur dioxide, the ammonia being reduced and leaving the system as nitrogen and the aluminum being converted to the alumina side or $Al_2O_3$ form. The gaseous products of the calcination reaction may be treated by standard procedures to recover the sulfur dioxide for reuse in the form of sulfuric acid.

The invention will be further understood from the following example:

Example

A representative leached zone feed assaying 15.2% $P_2O_5$, 23.2% $Al_2O_3$, 2.7% $Fe_2O_3$, 9.1% CaO, as an approximately 34% solids slurry in water is mixed with 98% sulfuric acid at approximately 1.6 pounds of dry solids per pound of acid and autoclaved at 200 pounds per square inch at a temperature of about 390° F. for one hour. The resulting mass was cooled and leached countercurrently with water to recover solubilized constituents and the insoluble cake discarded. Approximately 1.6 pounds of water per pound of dry leached zone feed was used in the countercurrent extraction of the solubilized values from the digestion. An average filtration rate throughout the countercurrent leaching operation of approximately 7 pounds of dry solids per square foot per hour was obtained. The resultant extract at approximately 1.3 specific gravity assayed approximately 4.7% $P_2O_5$, 6.6% $Al_2O_3$, 0.3% $Fe_2O_3$, and approximately 15.9% sulfate. Overall recoveries in the digesting and leaching circuits were approximately 89% $P_2O_5$, 81% $Al_2O_3$, and 81% $F_2O_3$. To this extract when at a temperature of 60° C. is added approximately 0.14 pound ammonium acid sulfate and 0.08 pound ammonium sulfate per pound of extract and the mixture cooled to approximately 20° C. to crystallize the material substantially as ammonium aluminum sulfate, also known as crude ammonium alum. This crystallized alum on a dry basis analyzes approximately 10.5% $Al_2O_3$, 38.4% sulfate, 4% ammonia, 44.8% chemical water, 0.3% $P_2O_5$, about 48.2 pounds of wet crystals, 5% moisture, are recovered per 6.57 pounds of $Al_2O_3$ in the liquor from the leached mineral digest.

To 100 pounds of liquor from the primary crystallization is added approximately 18.2 pounds of 28% ammonium hydroxide to adjust the pH range of the aqueous phase to approximately 4.5, the solids formed removed from solution, washed with water and the recovered material assayed approximately 13.3% $Al_2O_3$, 8.0% $Fe_2O_3$, and 29.6% $P_2O_5$ on a dry basis. The resulting liquor may be treated with ammonia hydroxide to precipitate triammonium phosphate or any other suitable method for recovery of the $P_2O_5$ values left in the liquor.

1,000 parts by weight of crude alum produced above was introduced into a rotary kiln and held at a temperature of approximately 1000° C. for approximately 2½ hours. The calcined product had a $P_2O_5$ content of approximately 0.44% and a bulk density of approximately 11 pounds per cubic feet.

A second 1,000 parts by weight portion of the crude alum was mixed with approximately 52.5 pounds of petroleum coke and introduced into the same rotary kiln. The calcined material was removed from the kiln after 2½ hours, i. e., the same length of time of treatment as before. The calcined product had a $P_2O_5$ content of approximately 0.2% and a bulk density of approximately 22 pounds per cubic foot.

A third portion of the crude alum of 1,000 parts by weight was introduced into an electric vacuum oven in which the temperature was maintained at approximately 230° C. and a vacuum was maintained of approximately 20 inches of mercury. The preliminary heat treatment was carried out for approximately 90 minutes. The partially dehydrated material was removed from the oven and mixed with approximately 52.5 parts by weight of petroleum coke and introduced into a rotary kiln used for calcining the previous material. This rotary kiln having lifters was maintained at approximately 1000° C., as before. The calcined material was removed from the furnace after 2½ hours and the calcined product had a bulk density of approximately 53 pounds per cubic foot. It will be observed that not only did the treatment lower the $P_2O_5$ content of the alumina to a point acceptable to the aluminum trade as metallurgical alumina, but also produced an alumina of a bulk density likewise acceptable to the aluminum trade.

Having thus described my invention, what I claim is:

1. A method of preparing metallurgical grade alumina which comprises treating phosphate-contaminated ammonium alum at temperatures below the melting point of the crude alum under conditions of temperature sufficient to partially dehydrate said alum to the extent of removing between about 10 and about 17 moles of water per mole of alumina, admixing the partially dehydrated alum with carbon and calcining the mixture under reducing conditions, whereby an alumina of greater than 22 lbs. per cubic foot bulk density is produced.

2. A process as in claim 1 wherein the dehydration temperature is between about 50° C. and about 250° C. and the calcining temperature is between about 700° C. and about 1400° C.

3. A process as in claim 2 wherein the partially dehydrated ammonium alum is treated with coke.

4. A process as in claim 1 wherein the ammonium alum is partially dehydrated to the extent of removing more than 12 moles of water per mole of alumina.

5. A process as in claim 1 wherein the partial dehydration takes place at temperatures between about 100° C. and about 250° C. while maintaining subatmospheric pressure in the range between about 5 lbs. per square inch and about 10 lbs. per square inch absolute.

6. A process as in claim 5 wherein the partially dehydrated ammonium alum is treated with coke and the calcining temperature is maintained within the range of between about 700° C. and about 1400° C.

References Cited in the file of this patent

UNITED STATES PATENTS

| | | |
|---|---|---|
| 1,686,112 | Tilley | Oct. 2, 1928 |
| 1,752,599 | Kjellgren | Apr. 1, 1930 |
| 1,948,888 | Sanders | Feb. 27, 1934 |
| 2,043,743 | Frary | June 9, 1936 |
| 2,402,471 | Tuwiner et al. | June 18, 1946 |
| 2,716,591 | Thomsen | Aug. 30, 1955 |

OTHER REFERENCES

Mellor: "Comprehensive Treatise on Inorganic and Theoretical Chemistry," vol. 5, 1924, pages 347 and 348.